United States Patent [19]

Grossner

[11] Patent Number: 5,417,530

[45] Date of Patent: May 23, 1995

[54] CLIP FOR FASTENING MULTILAYER INSULATION

[75] Inventor: Peter Grossner, Markdorf, Germany

[73] Assignee: Dornier GmbH, Germany

[21] Appl. No.: 113,085

[22] Filed: Aug. 30, 1993

[30] Foreign Application Priority Data

Aug. 28, 1992 [DE] Germany .................. 42 28 665.412

[51] Int. Cl.6 ...................... F16B 21/00; F16B 21/18; F16B 39/00

[52] U.S. Cl. .................................... 411/258; 411/339; 411/523; 411/970; 411/999

[58] Field of Search ............... 411/258, 352, 353, 522, 411/523, 524, 512, 970, 999, 338, 339

[56] References Cited

U.S. PATENT DOCUMENTS

| 901,132 | 10/1908 | Waltz | 411/999 X |
|---|---|---|---|
| 2,162,167 | 6/1939 | Greterman | 411/523 |
| 2,367,283 | 1/1945 | Judd | 411/524 |
| 3,023,473 | 3/1962 | Cochran . | |
| 4,848,089 | 7/1989 | Cramer | 411/523 X |

FOREIGN PATENT DOCUMENTS

| 1400762 | 11/1968 | Germany | 411/523 |
|---|---|---|---|
| 2701732 | 7/1978 | Germany . | |

OTHER PUBLICATIONS

"Handbook of Fastening and Joining of Metal Parts", Vallory H. Laughner and Augustus D. Hargan, First Ed., McGraw-Hill Book Co., Inc., 1956.

Primary Examiner—Neill R. Wilson
Attorney, Agent, or Firm—Evenson, McKeown, Edwards & Lenahan

[57] ABSTRACT

A clip for fastening an insulation having several layers, such as used on spacecraft. A counterhold which snaps onto the end of an elongated pin is made from an elongated strip of foil backed elastically deformable material. Holes in the elongated strip having a diameter such that they can lock in engagement with an annularly grooved portion of the pin.

20 Claims, 3 Drawing Sheets

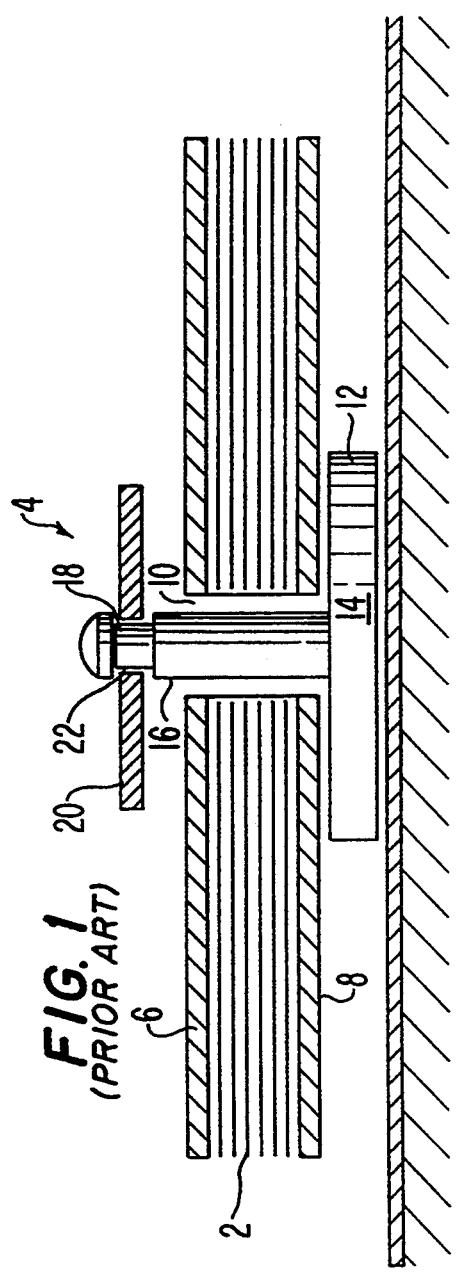
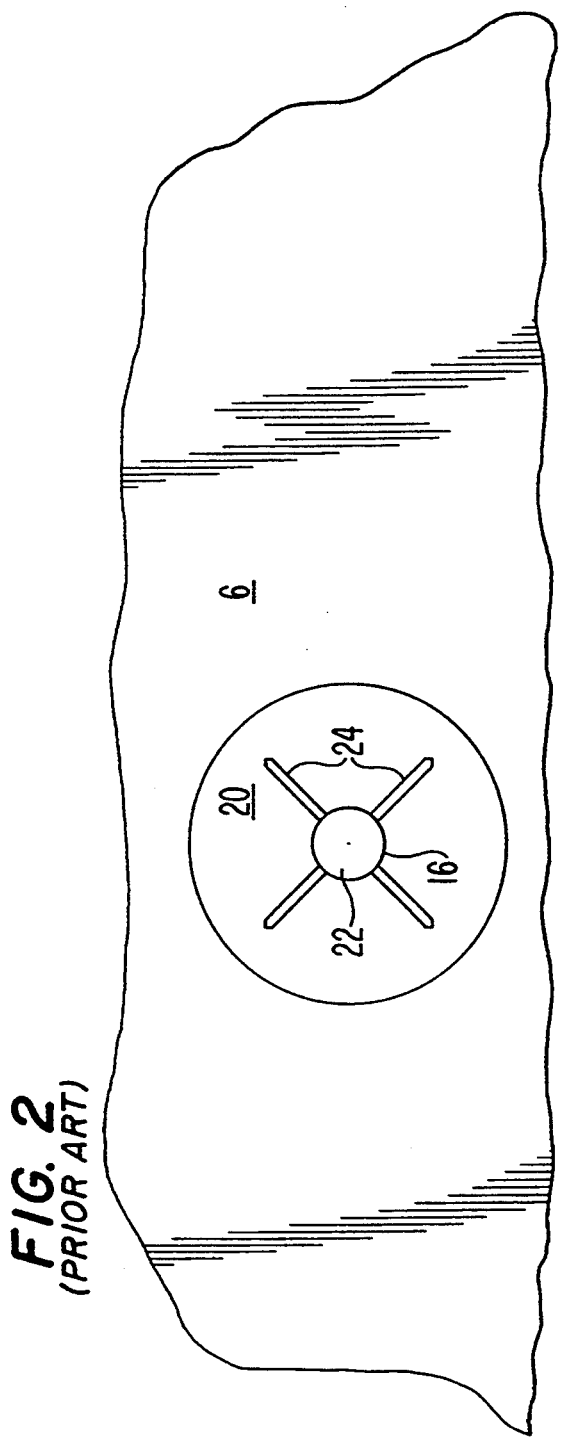

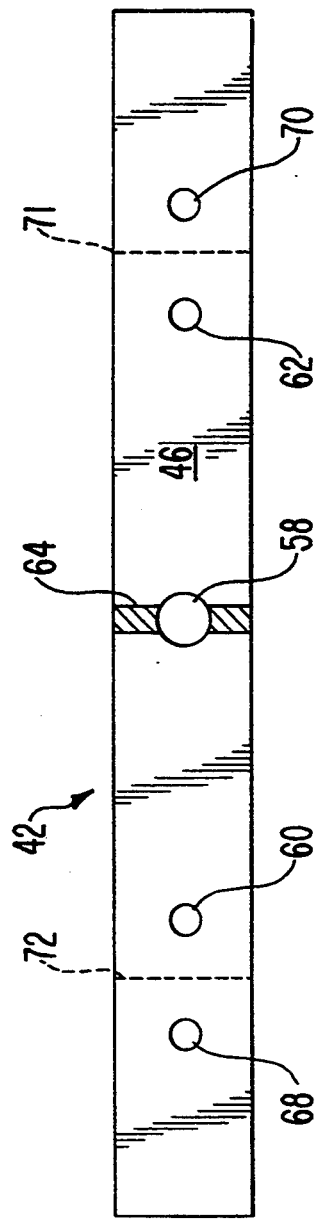
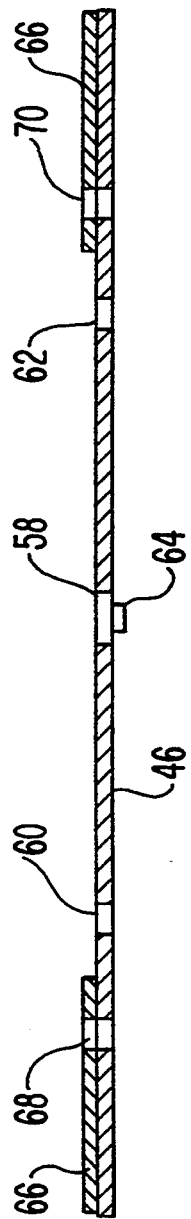
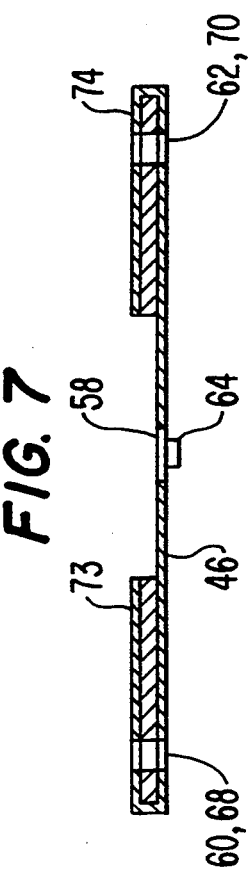

CLIP FOR FASTENING MULTILAYER INSULATION

BACKGROUND AND SUMMARY OF THE INVENTION

This invention relates to a clip, and particularly to a clip for fastening an insulation which consists of several layers (Multi-Layer Insulation, or "MLI") for space applications and for vacuum systems. More precisely, the object of the invention is a clip for MLI-fastening.

According to the state of the art, clips for such applications are made of plastic. A plug-in pin penetrates the insulation and mates with a counterhold which is a perforated disk made of plastic. The counterhold snaps in by way of a cap situated on the end of the shaft of the plug-in pin. Clips of this type, however, can become statically charged and interfere with the function of the satellite.

It is therefore an object of the present invention to provide a clip for the fastening of superinsulations (MLI), particularly on satellites, which has the following characteristics:
low weight
the clip washer directed into space must be grounded; captive
easily mountable, demountable and exchangeable manufacturable from known materials; and uniform contact pressure.

This and other objects and advantages are achieved by the fastener clip according to the invention, in which a counterhold that snaps onto the end of a pin shaft is made from a strip of foil backed polyamide material with adhesive coated areas at either end. In use, the adhesive coated areas are first folded back over the central portion of the strip to provide strong double thickness areas, each having a hole which can be snapped over the end of the clip pin, into annular grooves therein.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of a prior art clip;
FIG. 2 is a top view of a prior art clip;
FIG. 5 is a top view of the clip according to the invention in its unfolded state;
FIG. 6 is a cross-sectional side view of the clip according to the invention in its unfolded state;
and
FIG. 7 is a side view of the clip according to the invention with the end regions folded back on themselves.

DETAILED DESCRIPTION OF THE DRAWINGS

Figure 3:
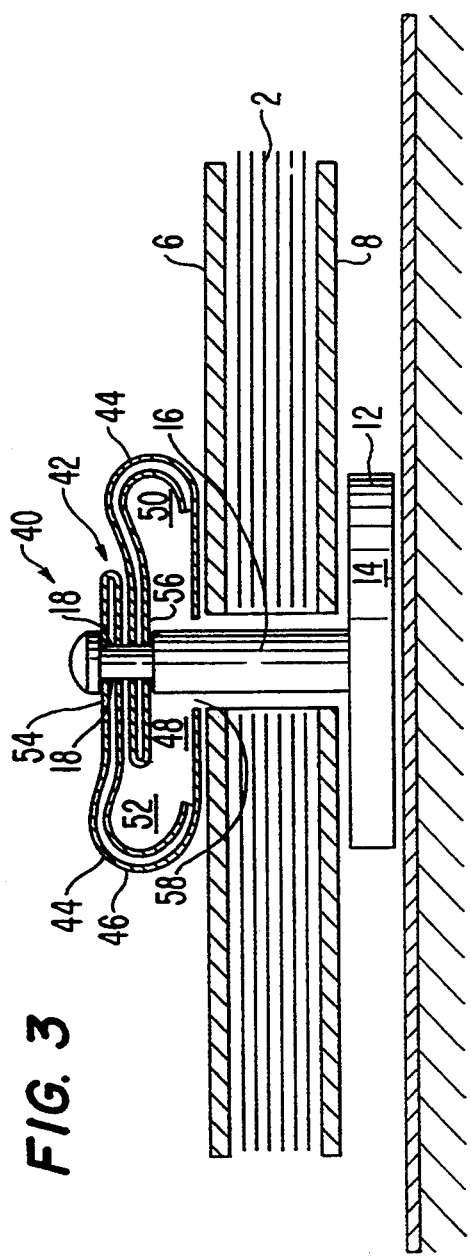
FIG. 3 is a sectional view of the clip according to the invention.
Figure 4:
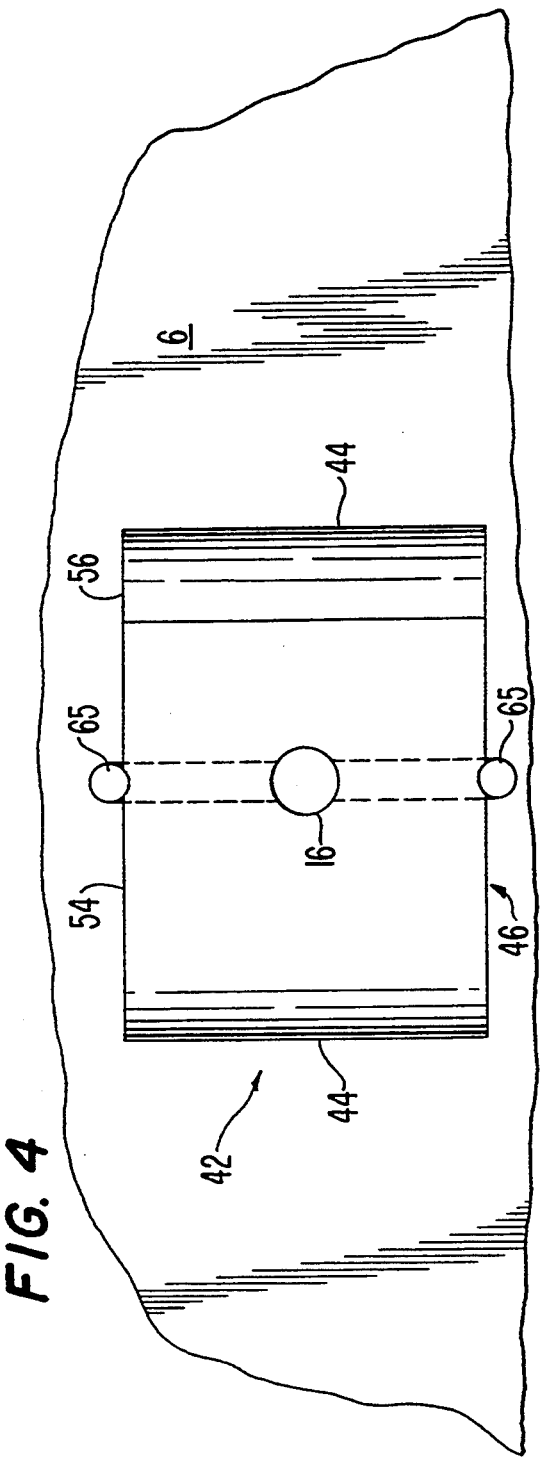
FIG. 4 is a top view of the clip according to the invention.

FIGS. 1 and 2 illustrate a wall 2 of a superinsulation (MLI) for use on satellites. The wall comprises several layers of different materials which are placed loosely above one another and are mechanically connected with one another by means of a clip 4. The cover layers 6, 8 of the wall 2 are made of an aluminized polyamide foil (trade name: Kapton).

In the wall 2, a hole 10 is situated into which a plug-in pin 12 is inserted.

The plug-in pin 12 comprises a disk 14 and a shaft 16. An annular groove 18 into which the counterhold 20 snaps by means of its hole 22 is situated in the area of the shaft end. In order to avoid a plastic deformation of the counterhold 20 during the clip-in operation, several incisions 24 are provided in the area of the hole 22.

FIGS. 3 to 7 illustrate the clip 40 according to the invention in which the reference numbers of FIG. 1 and 2 are used for identical components.

The clip 40 according to the invention has a different counterhold 42, which consists of a strip 46 made of Kapton foil folded over to both sides 44. The counterhold forms a loop 48 with bending radii 50, 52 and mutually overlapping ends 54, 56. The strip 46 has holes 58, 60, 62, 68 and 70 (FIG. 5) for receiving the plug-in pin 12. The central hole 58 has a larger diameter than the holes 60, 62, 68 and 70 which snap into the annular groove 18. In the area of hole 58, a self-adhesive double adhesive strip 64 is provided, as shown in FIGS. 5 to 7, which secures the counterhold 42 to the surface 6 of the insulation wall 2. In addition, a spot of conductive glue 65 may be provided at either end of the double adhesive layer 64. For the grounding of the clip, the strip 46 is coated with an electrically conductive material which establishes a contact to the cover layer 6 of the wall 2.

By folding-over of an adhesive tape 66, the ends 54 and 56 are also doubled, as illustrated in FIGS. 3 and 7. In the case of doubled ends, two additional holes 60, 68 and 62, 70 will exist in the undeformed strip (FIG. 5).

In order to use the fastener clip according to the invention, the adhesive coated ends 66 of the strip 46 are first folded back and secured on the central portion of the strip, with the holes 62, 70 and 60, 68 aligned. This results in the arrangement shown in FIG. 7, wherein the strip has two doubled end portions 73, 74, each of which has a hole having a diameter approximately equal to that of the pin shaft 16 in the region of the annular groove 18, and a larger central hole 58. The strip 46 is applied as a counter-hold to the pin 16 by first placing the center hole 58 over the pin 16 and pressing the strip onto the face 67 of the insulation wall 2 so that the double adhesive strip 64 holds it in place, and the conducting adhesive spots 65 assure electrical contact between the aluminized surface of the layer 46 and that of the insulation surface 6. One of the two doubled ends 73, 74 is then rolled back over the top of pin 16, and the hole 60, 68 or 62, 70 therein is pressed onto the pin 16 until it engages with the annular groove 18. Due to the elasticity of the polyamide film (kapton TM) from which the strip 46 is made, the hole 60, 68, or 62, 70 is not plastically deformed by this process, and fits snugly around the annular groove 18. This process is then repeated with the other doubled end of the strip 46, and the fastening process is completed, as shown in FIG. 3.

The fastener clip according to the invention as described above exhibits each of the desired properties recited previously, being: low weight, grounding of the counterholder, easily mountable and exchangeable, made from known and readily available materials and provides uniform contact pressure.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A clip comprising:
    an elongated pin adapted to penetrate a material to be held by said clip, said pin, having a locking portion with a transverse dimension that is smaller than a transverse dimension of a distal portion of said pin; and
    a counterhold comprising a strip of electrically conductive flexible elastic material having a central region and first and second end regions and having a plurality of holes therein, at least one of said holes being situated at each end region of said strip and being adapted to engage snugly around said locking portion of said pin;
    whereby said first and second end regions are adapted to be rolled back toward said central region of said strip so that said holes in said end regions can be placed over said elongated pin, and engaged with said locking portion thereof with said end regions overlapping each other.

2. Clip according to claim 1, wherein said end regions of said strip comprise a double layer of said elastic material.

3. Clip according to claim 1, wherein said locking portion of said pin comprises an annularly grooved area of said pin, and wherein said holes in said end regions have a diameter approximately equal to that of said annularly grooved area.

4. Clip according to claim 1, wherein said flexible elastic material has an electrically conductive surface layer coated thereon.

5. Clip according to claim 2, wherein said flexible elastic material is has an electrically conductive surface layer coated thereon.

6. A clip according to claim 1, wherein the counterhold is coated with an electrically conductive material.

7. A clip according to claim 2, wherein the counterhold is coated with an electrically conductive material.

8. A clip according to claim 1, wherein at least a first portion of said counterhold situated proximately at least one of said end regions thereof is coated with a self-adhesive glue.

9. A clip according to claim 2, wherein at least a first portion of said counterhold situated proximately at least one of said end regions thereof is coated with a self-adhesive glue.

10. A clip according to claim 6, wherein at least a first portion of said counterhold situated proximately at least one of said end regions thereof is coated with a self-adhesive glue.

11. A clip according to claim 1, wherein a second portion situated in said central region is provided with a self-adhesive double-adhesive strip.

12. A clip according to claim 2, wherein a second portion situated in said central region is provided with a self-adhesive double-adhesive strip.

13. A clip according to claim 8, wherein a second portion situated in said central region is provided with a self-adhesive double-adhesive strip.

14. A clip according to claim 8, wherein the glue is electrically conductive.

15. A clip according to claim 1, wherein said end regions comprise adhesive coated end portions of said strip which end portions are folded back on themselves to form a doubled layer.

16. Clip according to claim 15, wherein said end portions each have a plurality of holes therein, which holes are aligned when said end regions are folded back on themselves.

17. A counterhold for use with a clip comprising an elongated pin adapted to penetrate a material to be held by said clip, said pin having a locking portion with a transverse dimension smaller than a transverse dimension of a distal portion of said pin, said counterhold comprising:
    a strip of electrically conductive flexible elastic material having a central region and first and second end regions and having a plurality of holes therein, at least one of said holes being situated at each end region of said strip and being adapted to engage snugly around said locking portion of said pin;
    whereby said first and second end regions are adapted to be rolled back toward said central region of said strip so that said holes in said end regions can be placed over said elongated pin and engaged with said locking portion thereof, with said end regions overlapping each other.

18. Clip according to claim 17, wherein said flexible elastic material has an electrically conductive surface layer coated thereon.

19. Clip according to claim 18, wherein said locking portion of said pin comprises an annularly grooved area of said pin, and wherein said holes in said end regions have a diameter approximately equal to that of said annularly grooved area.

20. Clip according to claim 19, wherein said end regions comprise adhesive coated end portions of said strip which end portions are folded back on themselves to form a doubled layer.

* * * * *